Feb. 2, 1937.    S. SEGAL    2,069,563

KEY GAUGE

Filed March 15, 1932    3 Sheets-Sheet 1

Samuel Segal INVENTOR.

BY

ATTORNEY

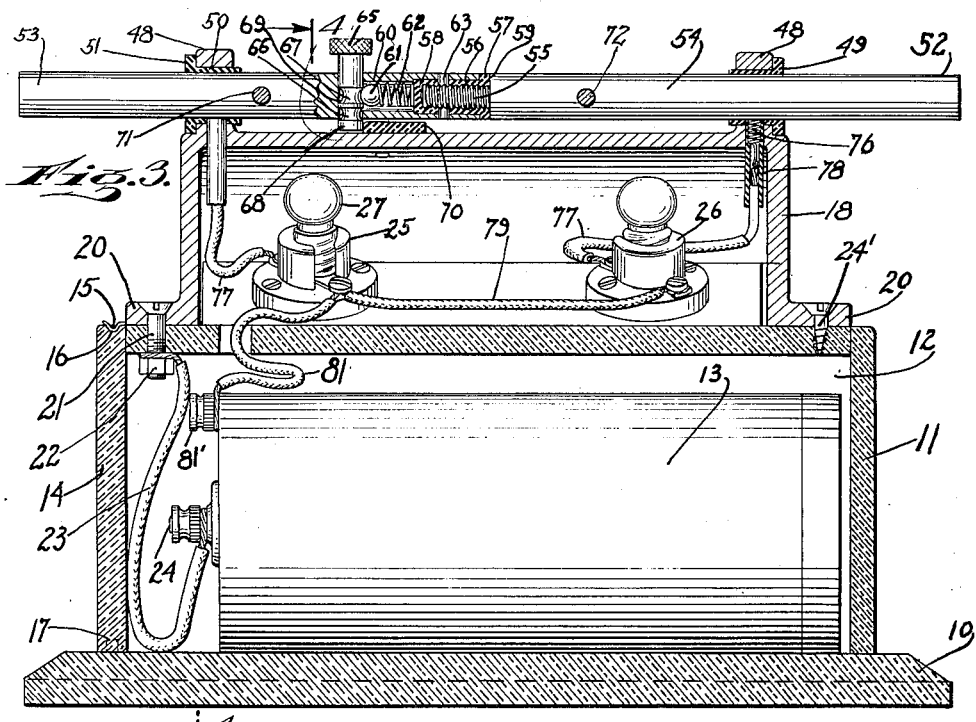

Feb. 2, 1937.  S. SEGAL  2,069,563
KEY GAUGE
Filed March 15, 1932  3 Sheets-Sheet 3
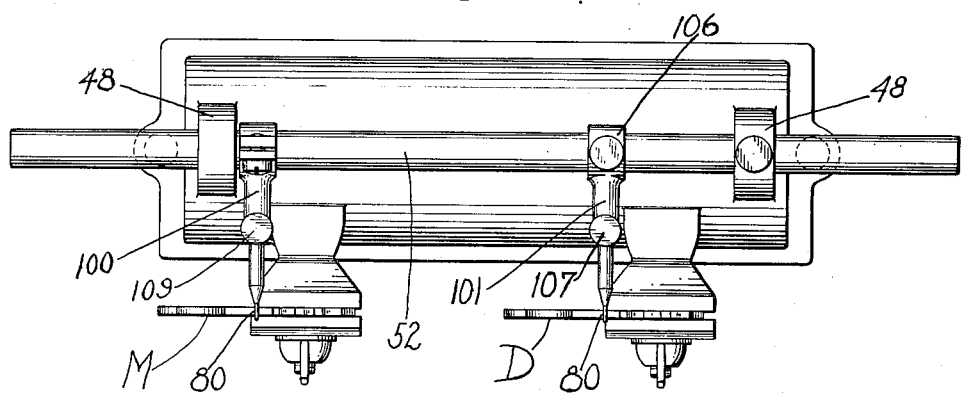
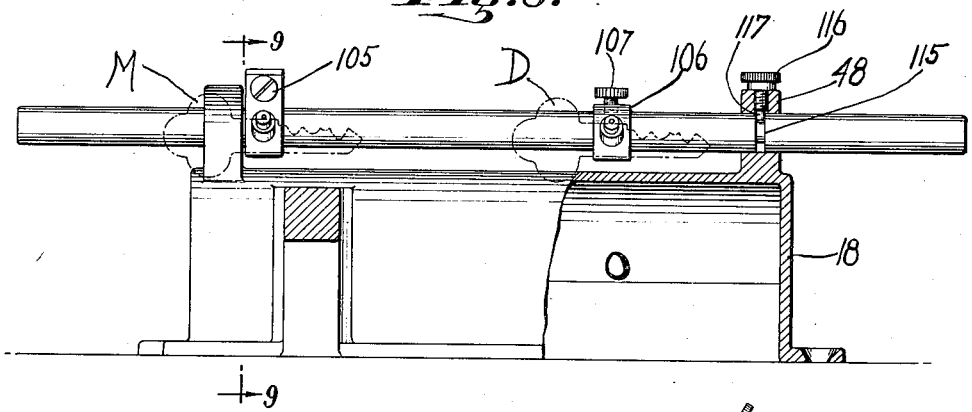
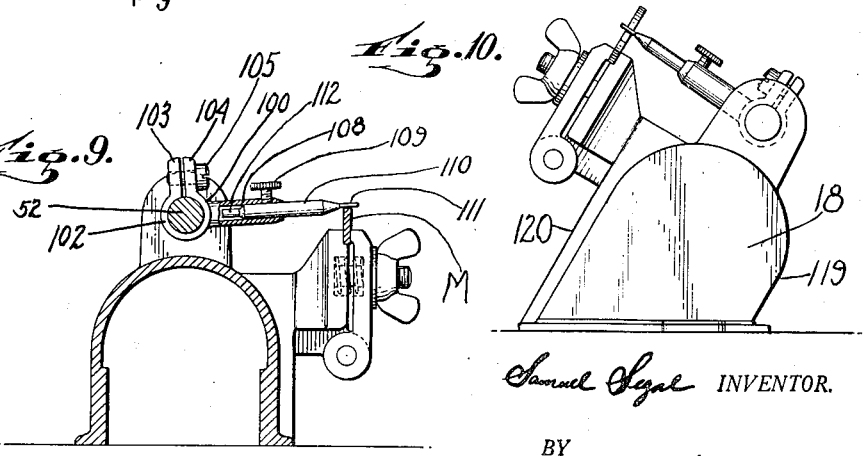
Samuel Segal INVENTOR.
BY
ATTORNEY Patented Feb. 2, 1937

2,069,563

UNITED STATES PATENT OFFICE 2,069,563

KEY GAUGE

Samuel Segal, New York, N. Y.

Application March 15, 1932, Serial No. 599,035

12 Claims. (Cl. 177—311)

The present invention has to do with checking or testing keys previously cut according to a predetermined code of a master key and more particularly it relates to a device having means for conveniently supporting a master key and a duplicated key, which device includes gauging means for comparing or testing the cuts of the duplicated key with respect to the cuts or bitings of the master key.

The invention has for its object and principally comprehends an improved construction or apparatus for gauging the bitings or cuts in several types of keys, which construction embodies suitable holding means for a master and duplicated key and test means operatively associated with a pair of signal means both of which are simultaneously responsive only when corresponding bitings of the master and duplicated keys are in exact accordance due to electrical contact established by the test means with similar wall portions of corresponding cuts in the keys.

The invention has for a further object the provision of a key gauging apparatus of the kind above indicated wherein a hollow casing is mounted on a housing in which an electrical source of energy is stored to operate signal devices, for example, small electric lamps, mounted in the casing, the latter cooperating with shiftable contact gauge or test means adapted to establish complete circuits and operate the signal devices when corresponding bitings in the master and duplicated keys agree.

In the key gauging apparatus according to this invention the master and duplicated key are appropriately clamped outside of the casing a predetermined distance apart and a carriage slidable longitudinally of the casing includes a pair of spaced gauging stems extending therefrom, the distance between the effective gauging parts of the stems corresponding to the predetermined distance between corresponding bitings of the keys and if the latter are in exact accordance a pair of lamps within the casing illuminate, the rays of the lamps however being viewable outside of the casing. If, however, only one of the lamps is rendered operative, the operator may readily determine what further operations are needed to produce a duplicated key in exact accordance with the master key.

The invention will be best understood from a consideration of the following detailed description when taken in connection with the accompanying drawings with the understanding however that such drawings illustrate merely by way of example some possible embodiments of the invention and that the invention is not confined to any strict conformity with the showing of such drawings but may be changed and modified so long as such changes and modifications mark no material departure from the salient features of the invention as expressed in the appended claims.

In the drawings:

Fig. 3 is a view similar to Fig. 1 but with certain parts in section and other parts broken away to show the interior construction.

Fig. 4 is a section approximately across the line 4—4 of Fig. 3 in the direction of the arrows.

Fig. 5 is a fragmentary view of the key gauging apparatus showing "barrel" type keys in position for testing.

Fig. 6 is a view similar to Fig. 5, however, illustrating a pair of flat keys in position for testing.

Figure 1:
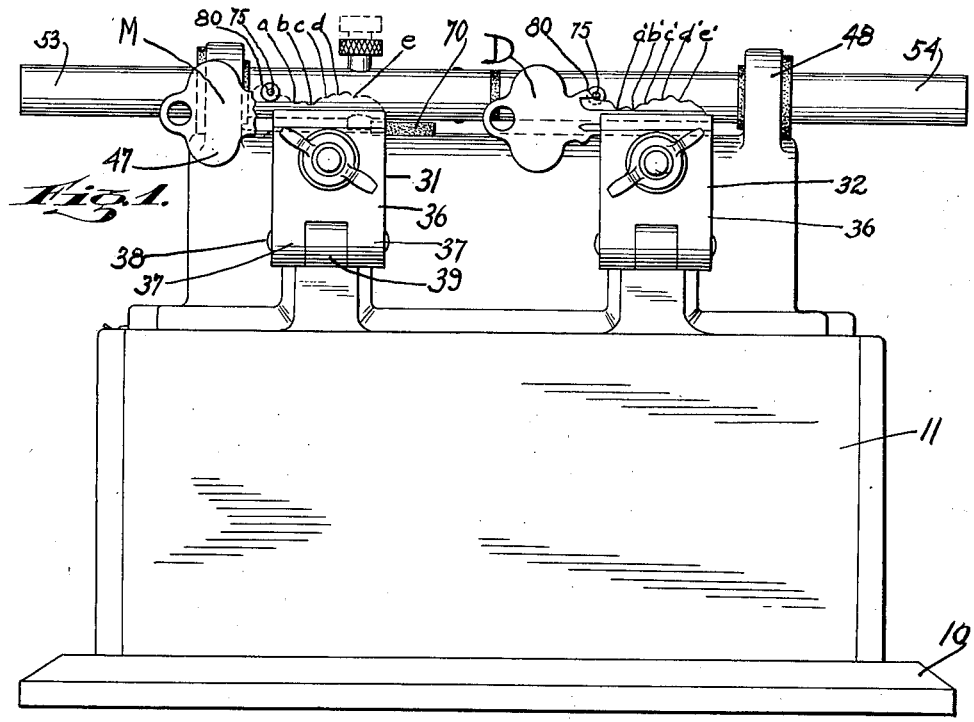
Fig. 1 represents a front elevation of the key gauging apparatus according to the invention and illustrates a pair of so called paracentric keys set up for testing.

Fig. 7 is a plan view of another modification; Fig. 8 is a front elevation of Fig. 7 partly in section; Fig. 9 is a section on the line 9—9 of Fig. 8 and Fig. 10 is a side elevation of another modification.

In accordance with the invention the apparatus includes a platform 10 which supports a hollow housing 11 providing a compartment 12 in which a suitable source of electrical energy, for example, an electric battery 13, is stored. The housing may be of wood or of a suitable insulating material. Access to compartment 12 may be had by removing closure 14 from one end of the housing. This is accomplished by first lifting the spring latch 15 away from the retaining recess 16 in the closure and subsequently removing the closure from guide posts as 17 the latter being suitably secured to the platform and adapted to receive companion openings appropriately formed in the lower face of the closure.

Conveniently mounted on the top wall of housing 11 is a hollow metal casing or support broadly denoted 18, which includes a lower peripheral flange 19, the latter having at each end a perforated lug 20.

Passing through one of the lugs and through an opening in the top wall of the housing is a threaded bolt 21, the lower portion of which is cooperatively associated with the clamping member or nut 22. This bolt and nut have a dual function. The first is to fasten the housing and casing together. The second is to provide an electrical ground connection for the electrical conduit 23 appropriately fastened to the positive terminal 24 of the battery 13 and to the bolt 21 by nut 22. It will be noted that the other lug at the opposite end of the metal casing is removably fastened to the top face of the housing by a screw 24'.

In the embodiment of the character described the top wall of the housing suitably supports the spaced sockets 25 and 26. In each of these sockets is disconnectably mounted an electric incandescent lamp as 27. According to the invention, each of the lamps is so arranged as to extend within a recess 28 formed in the metal casing and in line with a transverse medial plane of a respective forwardly extending arm 29 each of which is integral with the body of the casing. Although an electric lamp is disposed within a recess as 28 the upper portion thereof is slightly below a top plane 31 surrounding its lamp receiving recess.

Each arm 29 constitutes one component, the relatively stationary part, of the spaced key clamps generally denoted 31 and 32 respectively. Each stationary component includes a rabbeted groove forming a shoulder 33 adapted to provide a seat for a shank portion 34 of a key which is held secured to the shoulder or seat 33 by an inwardly extending flange 35 of a companion movable member as 36 which constitutes the other component of a respective key clamp.

Each movable component 36 includes spaced and perforated ears 37 hingedly mounted on an associated pin 38 appropriately fastened to a lug 39 integrally extending from the metal casing, the ears straddling the common intermediate lug 39.

Suitably secured to the stationary part or component of a key clamp is a threaded post 40. These posts pass through an opening 41 of an associated movable clamp component, the opening 41 being slightly larger than the diameter of the post. Encircling a portion of a post is a spring 42. This spring has its inner terminal seated in a recess as 43 in a stationary component of a respective clamp. The outer terminal of a spring 42 is confined in a pocket or recess 44 in the movable component of a key clamp. Normally the spring acts to spread a pair of clamping components apart.

A metal washer 45 is placed on the free portion of each threaded post and against the washer is disposed the wing nut 46 which if turned adjusts the effective clamping distance of the movable component with respect to its stationary component for properly clamping and holding a key properly guarded in seat 33.

For purposes of description, a key if secured in the left hand clamp 31 will be referred to as the master key and hereinafter identified by the reference character M and the key having bitings or cuts a', b', c', d', and e', previously fashioned or cut either by hand or in a cutting machine according to the bitings or cuts a, b, c, d and e of the master key M will be hereinafter referred to as the duplicated key and generally represented D, and is mounted in the clamp 32, at the right hand part of the casing. Of course, it is within the province of the invention to position the duplicated key in the left hand clamp 31 and the master key in the right hand clamp 32 preparatory to carrying out the testing or gauging operations namely, to determine whether the bitings such as a', b', c', d', and e' of the duplicated D conform respectively to the bitings a, b, c, d and e of the master key M. These bitings are usually made in the shank portion as 34 of a key blank of conventional paracentric design which is provided with a customary bulbous manipulating head 47.

The metal casing is provided at each end with an integral vertically extending ear or lug as 48. These opposed ears have their axially disposed perforations in alinement. Suitably mounted in each ear is an insulating bushing 49 which comprises a tubular portion 50 integrally connected to an annular flange 51 adapted to bear snugly against the outside end wall of its associated ear. Tubular portion 50 snugly fits the wall of the opening in an associated ear 48.

Rotatably and slidably disposed in the insulating bushings is a relatively long cylindrical shiftable gauge rod broadly denoted 52. This rod has an outside diameter closely approximating the inside diameter of the tubular insulating portions 50 thus permitting the rod to be easily shifted or adjusted longitudinally of the casing however without transverse play relative to the insulating bushings.

Rod 52 comprises two components 53 and 54 which are suitably joined and fastened together although properly insulated from each other.

Component 54 includes at its inner end a reduced threaded stem 55 which is suitably encased in an insulated cap comprising a tubular sleeve 56 having at one end the integral flange 57 and at the other end a closure part 58. The insulated cap is internally threaded and so positioned on the stem 55 that its flange 57 bears against a shoulder 59 of component 54.

The component 53 has as its inner end a longitudinal opening 60 in which the ball 61 and spring 62 are disposed. One end of the spring 62 bears against ball 61 and the other end against the closure wall 58 of the insulated cap which is suitably and snugly fitted with the interior walls of an opening slightly larger than opening 60 at the inner terminal end of component 53 which terminal abuts the insulated flange 57 and the cap portion 58 is seated against the shoulder formed by the longitudinally disposed openings in the hollow part of component 53. In order to supplement the holding action of the insulated joint of the character above set forth between the inner end of the complements of the gauge rod an insulating pin 63 is forced and driven into suitable alined transverse openings of the hollow terminal of complement 53, the insulating sleeve 56 and the threaded shank 55 of the other complement.

A manipulator 65 includes a shank portion having a pair of juxtaposed grooves 66 and 67, and a free lower portion 68. This shank is arranged as to be shiftable in the transverse opening 69. In the position illustrated terminal 68 of the manipulator shank is against the stop insulating plate 70 which is fixedly mounted on the top wall of the casing in any preferred manner. In this position which hereinafter will be referred to as the "start" position, ball 61 urged by spring 62 cooperates with upper groove 67 to lock the manipulator.

In the form illustrated, the manipulator may be moved to another position such that its terminal 68 is free of the stop plate 70. This is accomplished by grasping the knurled head of the manipulator and lifting upwardly thus causing ball 60 to move slightly to the right permitting the annular rib between the juxtaposed grooves to pass over the ball and causing the latter to enter into the lower groove 66 where it is locked due to the action of the spring.

The gauge rod 52 is provided with a pair of spaced metal extensions or posts 71 and 72, there being a post individual to each component. Each post is suitably secured at one end to its respective component with which it makes an electrical connection and the other or free terminal of a post comprises a tapered portion as 74 having a relatively fine attenuated stem 75. The stems of the spaced posts therefore always move in unison, regardless whether the gauge rod is slidably moved longitudinally of the casing or when the rod is turned or rotated to swing the posts towards or away from the clamped keys, the direction of the path of travel of a stem when swung either towards or away from a key being indicated by the dotted lines in Fig. 4.

In the form illustrated, each insulating bushing as 49 is provided with a suitable opening adapted to receive an electrical contact brush as 76 which is shown in the form of a spring. This brush always makes contact with a respective component of the gauge rod and is also electrically connected to an associated conduit or wire 77. Of course a brush 76 is suitably encased in an insulated fashion by a sleeve as 78 and properly insulated from the walls of the casing to prevent leakage of electrical current from a brush to a wall of the casing or from the rod to the casing.

An electric conductor 79 interconnects corresponding binding posts electrically associated with the lamp receiving sockets 25 and 26 and an electrical conductor 81 has one end electrically connected to the binding post 81' of the battery and its other end electrically connected to the aforementioned binding post of socket 25, the electrical set up being such that the spaced lamps 27 are arranged in parallel.

In determining whether the bitings of the duplicated key D conform to corresponding bitings of the master key M, the following steps are carried out:—

First the manipulator 65 is pressed down so that its terminal 68 extends beyond the sides of the guide rod. This rod is then shifted longitudinally until terminal 68 is against the insulated stop plate 70. This position is illustrated in Fig. 3.

In this position of the rod, the latter is partly rotated as to bring the free gauging or testing stem 75 of the posts slightly above their associated clamps.

Subsequently one of the keys is positioned in a clamp. In this connection it is assumed for the sake of convenience, that the master key M has been positioned between the complements of clamp 31. Having been positioned in this clamp the master key is then set so that its upper flange or lip 80 makes contact with the adjacent test stem 75 after which the key is securely clamped.

With the master key properly set and clamped against a test stem, a complete electrical circuit is established causing the left hand lamp to light up. Traced this circuit comprises battery 13, negative terminal 81', conductor 81, left hand lamp 27, conductor 77, brush as 76, rod component 53, post 71, test stem 75 thereof, master key M, arm 29 of the casing, shank 21, return conduit 23 and the positive terminal 24 of the battery.

The next operation consists in mounting the duplicated key D in the other or right hand clamp 32 and setting this key in such fashion that its stop flange 80 is in contact with the test stem of post 72 and in this position the duplicated key is clamped. In this clamped position a signal is also set up by reason of a complete circuit being established across right hand lamp 7 which is therefore rendered operative. Traced this circuit comprises battery 13, negative terminal 81', conduit 81, conductor 79, right hand lamp 27, conduit 77, brush 76, rod complement 54, post 72, its test or gauge stem 75, key D, right hand arm 29 of the casing, the body of the casing, shank 21, conduit 23 and positive terminal 24.

Figure 2:
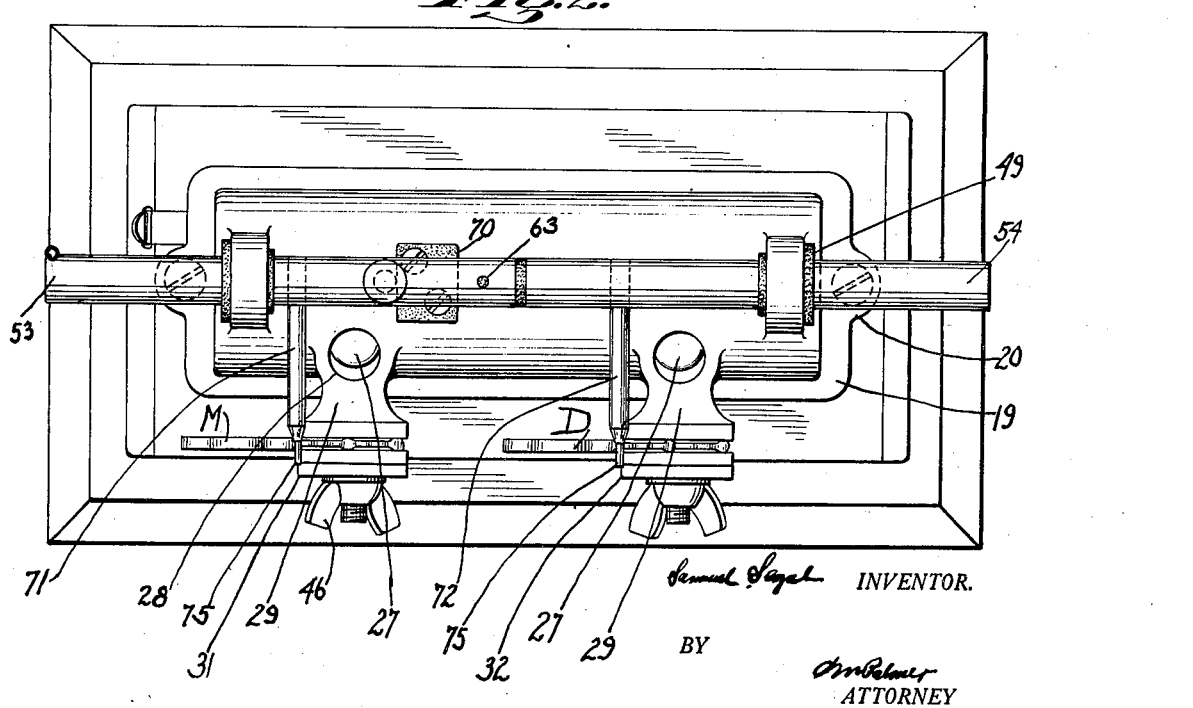
Fig. 2 is a plan view of Fig. 1.

With the master and duplicated keys set to the start positions as hereinbefore described and as illustrated in Figs. 1 and 2, like parts of both of the keys are a predetermined distance apart and two start signals are observable. Thus a test may be carried on to determine or gauge whether like bitings such as, $a$ and $a'$, or $b$ and $b'$ or $c$ and $c'$ etc., are in exact accordance as to depth and contour.

Accordingly, the manipulator 65 is moved upwardly (see dotted position in Fig. 1) to clear insulating plate 70. The guide rod is then slidably moved to the right until the spaced test stems of the post are over corresponding first bitings $a$ and $a'$ of the spaced keys after which rod 52 with its stem is swung slightly towards the walls of the corresponding grooves now subject to test for contact therewith.

If both stems make contact with like portions of the walls of their corresponding grooves, the biting of the duplicated key therefore conforms to its corresponding biting in the master key and hence both lamps illuminate. If, for example, biting $a'$ were cut slightly high, its associated stem when swung towards it would first make contact with the walls of this biting and the right hand lamp is rendered operative. The left hand gauge stem, however, would be slightly spaced from and out of contact with the walls of the alined biting of the master key and therefore the left hand lamp would be out. That is to say, if, on gauging the corresponding bitings, just the right lamp lights up, this teaches the operator that the duplicated key has not been sufficiently cut. Where, on the other hand, a biting in the duplicated key has been made too deep the gauge stem for the master key only would make contact and establish its circuit to light up its lamp and the lamp associated with the duplicated key would be inoperative.

In a similar fashion, the gauge rod may be operated to test the bitings $b'$, $c'$, $d'$ and $e'$ of the duplicated key with respect to the corresponding bitings $b$, $c$, $d$ and $e$ respectively of the master key. If the bitings of the duplicated key have been insufficiently cut, this key may be subsequently filed down and tested with similar cuts of the master key. In the course of a test, overcut bitings of a duplicated key are easily distinguishable since the lamp associated with the master key only lights up. If any of the bitings of the duplicated key have been undercut, only the lamp associated with the duplicated key lights up.

The gauge test apparatus according to the invention is applicable to gauge the cuts of duplicated keys of barrel shape or duplicated flat type of keys. In the case of testing barrel keys (see Fig. 5) the master and duplicated keys are first set in their clamps with corresponding parts, such as shoulders 90, a predetermined distance apart to correspond to the distance between the gauging stems. Subsequently the manipulator 65 is raised and the gauge rod is slidably moved to the right and turned to swing the stems 75 against the walls of corresponding cuts or notches 91 of the keys M and D.

With the spaced stems 75 disposed in corresponding notches of keys M and D these bitings may be tested to determine if they agree. If they agree, both of the lamps light. If they fail to conform only one light illuminates and from this the operator may determine whether the duplicated key need be further cut or is beyond correction. Of course, the corresponding bitings as 92 may be gauged in a similar fashion.

In the case of flat keys (see Fig. 6) these may be similarly gauged. In this connection it will be noted that keys M and D have been set the usual predetermined distance apart in the clamps after which corresponding notches may be tested by actuating the gauge rod 53 and swinging the test stems 75 of the gauge rod into corresponding bitings of both keys and against the walls of these notches.

In the form of the invention illustrated in Fig. 3 the electric battery is stored in a separate housing, but in practice the latter may be omitted and if desired the battery may be suitably stored in the casing or both the housing and battery may be dispensed with and the casing 18 be mounted on a suitable support. With the battery and electrical connections omitted, the spaced stems only of the gauge rod 52 are utilized to determine the accuracy of the bitings in the duplicated key with respect to corresponding bitings of the master key, the gauge rod, in this case (see Figs. 7–9) being a unitary cylindrical body slidably disposed in perforated and alined ears 48 of the casting or casing 18.

According to the embodiment illustrated in Figs. 7–9 inclusive, a pair of key gauge stem supports are slidably and adjustably mounted in spaced relation on the cylindrical gauge rod 52, one gauge stem support of the pair by way of preference being generally designated 100 and the other 101.

Gauge stem support 100 comprises a curved strap 102 which terminates in outwardly extending spaced and facing lugs 103 and 104. Strap 102 although closely embracing rod 52 may be adjustably positioned therealong if set screw 105 which is adjustably secured to lugs 103 and 104 is operated to slightly diverge the latter, thus loosening the strap about the rod. If the gauge stem support 101 is set to a desired position along the rod, this position may be retained by operating the set screw 105 to bring lugs 103 and 104 more towards each other thereby causing the intermediate strap to firmly and frictionally embrace the gauge rod.

The gauge rod stem support 101 likewise may be slidably moved to a desired position along the gauge rod and subsequently quickly fastened thereto as to swing in unison therewith and prevented from longitudinal or rotary displacement relative to the gauge rod. To this end the gauge stem support 101 comprises an annulus 106 having an internal diameter slightly larger than that of the gauge rod and being adapted to be slid longitudinally of the rod to any desired position after which this position may be retained by operating the set screw 107 which is threadably connected to one wall of the annulus. When set screw 107 is tightened its stem or shank frictionally engages a surface of the rod and prevents the annulus from moving relative to the gauge rod. If set screw 107 is loosened, annulus 106 may quickly be moved along the rod to a selected location.

Each of the gauge stem supports 100 and 101 has a gauge stem holder or socket as 108 preferably integrally cast with a respective strap 102 or annulus 106, the holder being in the form of a hollow cylindrical shell to which is secured adjacent its free terminal a set screw 109.

Adjustably and removably mounted in each gauge stem holder is a key gauge stem generally designated 110 which comprises an elongated body or shank having at one end a free terminal or fine portion 111 having a relatively small diameter for gauging bitings of "thin keys" and at its other free end a "coarse" terminal 112 of a slightly larger diameter for gauging the bitings of "thick keys."

As shown in Fig. 9 gauge stem 110 is so arranged that the fine gauge terminal 111 is exposed while its other gauge terminal is within the stem holder. Obviously the fine and coarse free portion of a removable gauge stem may be interchanged with respect to each other. This is accomplished by loosening set screw 109, removing the gauge stem from its holder and turning the stem one hundred and eighty degrees until the desired gauge terminal is facing the operator. Subsequently this gauge stem is disposed within the holder after which the gauge stem may be bodily moved to and from within its holder such that its free exposed and selected terminal slightly extends beyond a front face of an associated key fastened in one of the key clamps. Having properly adjusted the gauge stem in its holder, this position may be retained by operating set screw 109 as is well understood.

In the form of the invention according to Figs. 7–9 inclusive, the gauge rod is provided at one end with an annular groove 115 which cooperates with a set screw 116 adjustably mounted on one ear 48 of the casing. Set screw 116 may be adjusted so that its restricted terminal 117 be confined between the walls of groove 115. In such position rod 52 with its gauging stems may be rotated about the longitudinal axis of the rod but the latter is prevented from longitudinal displacement with respect to the casing until terminal 117 is totally removed from groove 115.

To test corresponding bitings of a master and duplicated key, the gauge rod is first brought to a start position, namely, to a position where it is prevented from being longitudinally displaced. In this position terminal 117 of set screw 116 is within annular groove 115. If desired and necessary, the gauge stem supports may be conveniently adjusted at this time. These gauge stem supports with their stems are then swung towards and slightly above respective clamps. One of the keys is then put into a clamp until its stop flange 80 is against a free terminal of a gauge stem. Then the other key is placed and fastened in the other clamp until its flange 80 is against a free terminal of its adjacent gauge stem. The start positions of the gauge rod and its gauging stems and the keys to be gauged which are set to a like position preparatory to gauging their corresponding bitings are illustrated in Figs. 7 and 8. Subsequently, set screw 116 is adjusted to remove its restricted terminal out of the groove 115 to permit the gauge rod with its gauging stems to be bodily moved longitudinally of the casing. Testing of corresponding bitings of the master and duplicated keys is then carried out in the manner as heretobefore described in connection with embodiments illustrated in Figs. 1 to 6 inclusive.

In accordance with the method of testing corresponding bitings of the keys hereinbefore set forth, the keys were set in their clamps to the predetermined position of the gauging stems. However the invention is not limited to this preliminary step. For example, the keys may be first set in their clamps, say a certain distance apart. The gauge stems may then be swung towards the keys and quickly adjusted along the rod to assume a start position corresponding to the certain distance between the keys. In other words in the earlier method disclosed, the keys were set to the effective distance between the gauging stems. With the later method, the gauging stems may be quickly adjusted to an effective distance between the clasped keys.

In Fig. 10 the casing has been slightly modified such that the back and front walls 119 and 120 are inclined and the front wall is relatively longer than the rear wall. This permits the clamps to be normally slightly tilted and the keys held therein may be easily and quickly tested for the gauging stems and the undulations of the keys are more conveniently in the line of vision of the operator.

While I have shown and described a preferred embodiment of my invention, it will be understood that changes involving omission, alterations, substitution and reversal of parts and even changes in the mode of operation may be made without departing from the scope of my invention defined in the appended claims.

I claim:

1. In a test apparatus of the character described, the combination of, a support having spaced clamps each adapted to sustain a key, a shiftable member disposed longitudinally of said support, means for slidably and rotatably supporting said member, and spaced extensions bodily carried by said member and having terminals adapted to cooperate with corresponding bitings of said keys.

2. In a test apparatus of the character described, the combination of, a support having spaced clamps each adapted to removably sustain a key, a shiftable member, means for rotatably and slidably supporting said member, spaced extensions carried by said member, gauging means for cooperating with corresponding bitings of said keys, and means for adjustably sustaining said gauging means relative to said extensions.

3. In a test apparatus of the character described, the combination of, a support, spaced clamping means associated with said support for removably supporting a plurality of keys in spaced relation such that corresponding bitings of said keys are a predetermined distance apart, shiftable means, means for rotatably and slidably supporting said shiftable means, and spaced extensions carried by said shiftable means substantially normal thereto and comprising terminals spaced apart a distance corresponding to the distance between corresponding bitings of said spaced keys for gauging said corresponding bitings.

4. In a test apparatus of the character described, the combination of, a support having spaced clamps for removably holding a pair of keys in spaced relation such that corresponding bitings of the latter are a predetermined distance apart, one of said keys being a master key and the other of said pair a duplicated key, a source of energy, a lamp individual to each of said keys, a circuit for each of said lamps and electrically associated with said source and comprising shiftable means insulated from said support, means for slidably and rotatably supporting said shiftable means, spaced extensions carried by said shiftable means and insulated from each other, and terminals on said extensions receivable in and adapted to contact corresponding bitings of said keys for rendering said lamps incandescent.

5. In a test apparatus of the character described, the combination of, a support having spaced clamps for removably supporting spaced keys such that corresponding bitings of the latter are a predetermined distance apart, a rod disposed longitudinally of said support, means rotatably and slidably supporting said rod, spaced extensions secured to said rod and substantially normal thereto and having terminals spaced apart a distance corresponding to the distance between corresponding bitings of said keys, said rod comprising insulated components each insulated from said support, a source of energy, and a lamp for each of said components and electrically associated therewith and said source of energy, said terminals on contact with said corresponding bitings of said keys pursuant to rotation of said rod towards and against said keys adapted to complete a plurality of electric circuits including said components, extensions and keys for rendering said respective lamps incandescent.

6. In a test apparatus of the character described, the combination of, a support having a clamp for holding a master key and a clamp for holding a duplicated key, a rod disposed longitudinally of said support and comprising insulated and alined components, means for rotatably and slidably supporting said rod, each of said components including an extension substantially normal to said rod, said extensions having spaced terminals adapted to be received by and contact corresponding bitings of said keys, a source of energy, a circuit for each of said keys and each including said source of energy, and a signal disposed in each of said circuits, said circuits being closed upon contact of said terminals with similar parts of corresponding bitings of said keys pursuant to rotation of said rod in a direction towards and against said keys to render said signals of said circuits operative.

7. In a test device of the character described, the combination of, a support having spaced clamps for removably supporting a pair of spaced keys such that corresponding bitings thereof are a predetermined distance apart, a rod disposed longitudinally of said support, means for rotatably and slidably sustaining said rod, spaced extensions substantially normal to said rod and carried by the latter and having terminals receivable in corresponding bitings of said keys, stop means associated with said support, and manipulatable means carried by said rod adapted to abut said stop means during lateral bodily displacement of said rod in one direction.

8. In a test device of the character described, the combination of, a support having spaced clamps for removably supporting a pair of spaced keys such that corresponding bitings are a predetermined distance apart, a rod disposed longitudinally of said support, means for rotatably and slidably sustaining said rod, spaced extensions substantially normal to said rod and carried by the latter and having terminals receivble in corresponding bitings of said keys, stop means associated with said support, manipulatable means carried by said rod adapted to abut said stop means during lateral bodily displacement of said rod in one direction, and locking means cooperating with said manipulatable means to hold the latter in a set position.

9. A gauge for determining the accuracy of bitings in a duplicated key in respect to corresponding bitings of a master key, comprising, in combination, a support having means for holding said keys in spaced relation, a rod disposed longitudinally of said support, means slidable and rotatably sustaining said rod relative to said support, spaced extensions substantially normal to said rod and projecting from the latter and insulated from each other, said extensions having spaced gauging terminals, a pair of lamps, a source of energy, circuits for said lamps associated with said source and comprising in part said extensions and said master and duplicated key, said terminals upon rotation of said rod in one direction moving in unison and entering into engagement with corresponding bitings of said spaced keys for lighting up both of said lamps provided said corresponding bitings are in exact accordance.

10. A gauge for determining the accuracy of bitings of a duplicated key in respect to corresponding bitings of a master key, comprising, in combination, a support having means for holding said keys in spaced relation, a rod disposed longitudinally of said support, means slidably and rotatably sustaining said rod relative to said support, spaced extensions substantially normal to said rod and insulated from each other, said extensions having spaced terminals, a pair of lamps, a source of electrical energy common to the latter, independent electrical circuits including said source, said extensions and said keys; said terminals upon rotation of said rod adapted to swing towards and against corresponding bitings of said master and duplicated key and light up one of said lamps provided similar parts of corresponding bitings of said master and duplicated key are not in exact accordance.

11. In a test device of the character described, means for holding spaced keys a predetermined distance apart, a rod disposed longitudinally of said support, means rotatably and slidably supporting said rod, spaced sockets substantially normal to said rod and carried thereby, extensions slidably guided by said sockets, and locking means to prevent movement of said extensions relative to said sockets, said extensions having spaced terminals receivable in and for comparing corresponding bitings of said keys.

12. In a test device of the character described, a support having spaced clamps for removably supporting a master and a duplicated key such that corresponding bitings thereof are a predetermined distance apart, a rod disposed longitudinally of said support, means rotatably and slidably supporting said rod, means to prevent longitudinal displacement of said rod relative to said support, spaced sockets substantially normal to said rod and carried by the latter, a key gauging element disposed in each socket and slidably associated therewith, and locking means to prevent displacement of said gauging elements relative to said sockets, said elements having terminals spaced apart a distance corresponding to the distance between corresponding bitings of said keys and receivable in said corresponding bitings for comparing the latter.

SAMUEL SEGAL.